United States Patent
Uchiyama

(10) Patent No.: US 10,282,991 B2
(45) Date of Patent: May 7, 2019

(54) INFORMATION PROCESSING APPARATUS, COMMUNICATION APPARATUS, INFORMATION PROCESSING METHOD, AND PROGRAM

(71) Applicant: SONY CORPORATION, Tokyo (JP)

(72) Inventor: Hiromasa Uchiyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/741,582

(22) PCT Filed: Jun. 7, 2016

(86) PCT No.: PCT/JP2016/066821
§ 371 (c)(1),
(2) Date: Jan. 3, 2018

(87) PCT Pub. No.: WO2017/043133
PCT Pub. Date: Mar. 16, 2017

(65) Prior Publication Data
US 2018/0197412 A1  Jul. 12, 2018

(30) Foreign Application Priority Data

Sep. 11, 2015  (JP) ................. 2015-179401

(51) Int. Cl.
| | |
|---|---|
| G08G 1/00 | (2006.01) |
| G08G 1/127 | (2006.01) |
| H04W 4/04 | (2009.01) |
| H04W 4/44 | (2018.01) |
| G08G 1/0967 | (2006.01) |
| G08G 1/01 | (2006.01) |
| G08G 1/0965 | (2006.01) |
| H04W 4/90 | (2018.01) |

(52) U.S. Cl.
CPC .......... G08G 1/127 (2013.01); G08G 1/012 (2013.01); G08G 1/0112 (2013.01);
(Continued)

(58) Field of Classification Search
CPC .......... G08G 1/127; G08G 1/096791; G08G 1/096775; G08G 1/0112; G08G 1/0141;
(Continued)

(56) References Cited

U.S. PATENT DOCUMENTS

2005/0035878 A1* 2/2005 Vassilevsky ......... G08G 1/0965
340/902
2010/0171640 A1* 7/2010 Delia .................. G08G 1/07
340/907
(Continued)

FOREIGN PATENT DOCUMENTS

| JP | 2009-216445 A | 9/2009 |
| JP | 2012-037940 A | 2/2012 |
| JP | 2014-086749 A | 5/2014 |

OTHER PUBLICATIONS

International Search Report dated Sep. 13, 2016 in PCT/JP2016/066821, filed on Jun. 7, 2016.

Primary Examiner — Anh V La
(74) Attorney, Agent, or Firm — Xsensus LLP

(57) ABSTRACT

An information processing apparatus in accordance with the present disclosure includes processing circuitry configured to detect an occurrence of an event; receive, via a base station to which a communication apparatus loaded onto a moving body belongs, information related to the moving body from the communication apparatus; and determine whether or not to recognize the moving body as an execution subject of an operation appropriate to the event, on a basis of the information related to the moving body and information indicating the event.

14 Claims, 10 Drawing Sheets

| V | I | P | H |
|---|---|---|---|
| • Passenger vehicle<br>• Commercial or fleet vehicle<br>• Emergency vehicle<br>• Transit vehicle | • Cellular network<br>• Data centre<br>• Fleet or freight management centre<br>• Traffic management centre<br>• Weather service<br>• Rail operation centre<br>• Parking system<br>• Toll system | • Cyclist<br>• Pedestrian shelter<br>• Motorcycle | • Home network<br>• Garage<br>• Enterprise or dealer networks |

(52) U.S. Cl.
CPC ......... *G08G 1/0116* (2013.01); *G08G 1/0133* (2013.01); *G08G 1/0141* (2013.01); *G08G 1/0965* (2013.01); *G08G 1/096741* (2013.01); *G08G 1/096775* (2013.01); *G08G 1/096791* (2013.01); *G08G 1/205* (2013.01); *H04W 4/04* (2013.01); *H04W 4/44* (2018.02); *H04W 4/90* (2018.02)

(58) Field of Classification Search
CPC ...... G08G 1/0133; G08G 1/012; G08G 1/205; G08G 1/096741; G08G 1/0965; G08G 1/0116; H04W 4/44; H04W 4/90; H04W 4/04
USPC ................ 340/901, 902, 903, 905, 906, 907
See application file for complete search history.

(56) References Cited

U.S. PATENT DOCUMENTS

| | | | | |
|---|---|---|---|---|
| 2012/0112927 | A1* | 5/2012 | Grieco | G08G 1/04 340/906 |
| 2015/0243165 | A1* | 8/2015 | Elsheemy | B60R 25/00 340/906 |
| 2017/0032670 | A1* | 2/2017 | Poornachandran | G08G 1/096716 |

* cited by examiner

INFORMATION PROCESSING APPARATUS, COMMUNICATION APPARATUS, INFORMATION PROCESSING METHOD, AND PROGRAM

TECHNICAL FIELD

The present disclosure relates to an information processing apparatus, a communication apparatus, an information processing method, and a program.

BACKGROUND ART

In recent years, wireless communication systems using a communication apparatus loaded onto a moving body such as a vehicle are being utilized. Technologies that use such a wireless communication system to perform recognition of a moving body as the execution subject of a specific operation are being proposed.

For example, Patent Literature 1 discloses a technology for efficiently performing an authentication process for realizing a security function, in which the technology, by an onboard apparatus loaded onto a vehicle, executes an authentication process with a roadside apparatus, acquires authentication information indicating validity in a specific area of a road, and transmits/receives information including the authentication information with another onboard apparatus loaded onto another vehicle.

CITATION LIST

Patent Literature

Patent Literature 1: JP 2012-37940A

DISCLOSURE OF INVENTION

Technical Problem

Herein, performing the recognition of a moving body as the execution subject of a specific operation rapidly in response to the occurrence of an event is considered to be more desirable. In traffic, ambulances, police vehicles, fire engines, and the like are recognized as emergency vehicles which are the execution subject of emergency travel, and general vehicles must yield the way so as not to impede the progress of emergency vehicles. When a traffic accident occurs, for example, by recognizing a general vehicle driven by a physician and traveling around the accident site as an emergency vehicle, and enabling emergency travel by the vehicle driven by the physician, the arrival time of the physician to the accident site can be shortened in some cases compared to the case of waiting for the arrival of an emergency vehicle to the accident site.

Accordingly, the present disclosure proposes a new and improved information processing apparatus, a communication apparatus, an information processing method, and a program capable of performing the recognition of a moving body as the execution subject of a specific operation rapidly in response to the occurrence of an event.

Solution to Problem

According to the present disclosure, there is provided an information processing apparatus including: a detection section configured to detect an occurrence of an event; a communication section configured to receive, via a base station to which a communication apparatus loaded onto a moving body belongs, information related to the moving body from the communication apparatus; and a determination section configured to determine whether or not to recognize the moving body as an execution subject of an operation appropriate to the event, on a basis of the information related to the moving body and information indicating the event.

Further, according to the present disclosure, there is provided a communication apparatus which, in a case in which an information processing apparatus including a detection section configured to detect an occurrence of an event, a communication section configured to receive, via a base station to which a communication apparatus loaded onto a moving body belongs, information related to the moving body from the communication apparatus, and a determination section configured to determine whether or not to recognize the moving body as an execution subject of an operation appropriate to the event, on a basis of the information related to the moving body and information indicating the event, transmits information for the communication apparatus to transmit a signal indicating that the moving body recognized as the execution subject by the determination section is the execution subject that is valid of the operation, the communication apparatus transmits the signal indicating that the moving body is the valid execution subject of the operation.

Further, according to the present disclosure, there is provided an information processing method including: detecting, by an information processing apparatus, an occurrence of an event; receiving, via a base station to which a communication apparatus loaded onto a moving body belongs, information related to the moving body from the communication apparatus; and determining whether or not to recognize the moving body as an execution subject of an operation appropriate to the event, on a basis of the information related to the moving body and information indicating the event.

Further, according to the present disclosure, there is provided a program causing a computer that controls an information processing apparatus to function as: a detection section configured to detect an occurrence of an event; a communication section configured to receive, via a base station to which a communication apparatus loaded onto a moving body belongs, information related to the moving body from the communication apparatus; and a determination section configured to determine whether or not to recognize the moving body as an execution subject of an operation appropriate to the event, on a basis of the information related to the moving body and information indicating the event.

Advantageous Effects of Invention

According to the present disclosure as described above, it is possible to perform the recognition of a moving body as the execution subject of a specific operation rapidly in response to the occurrence of an event.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
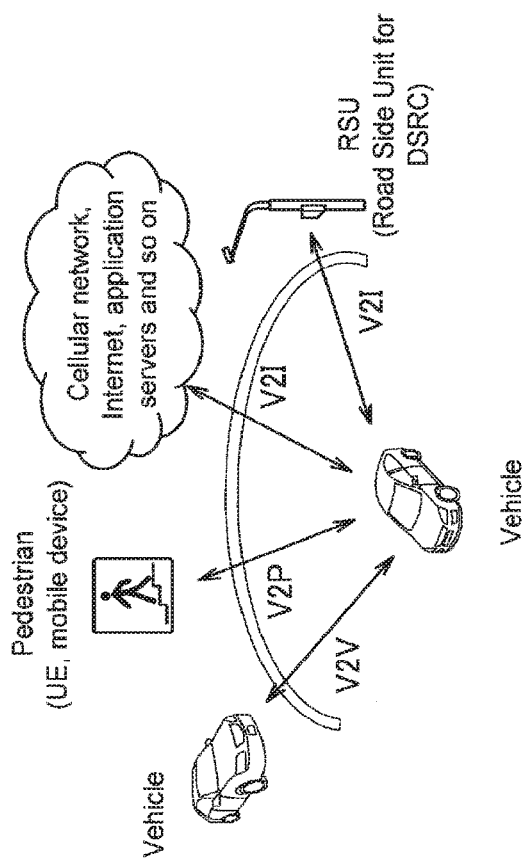
FIG. 1 is an explanatory diagram for describing an overview of V2X communication.
Figure 1:
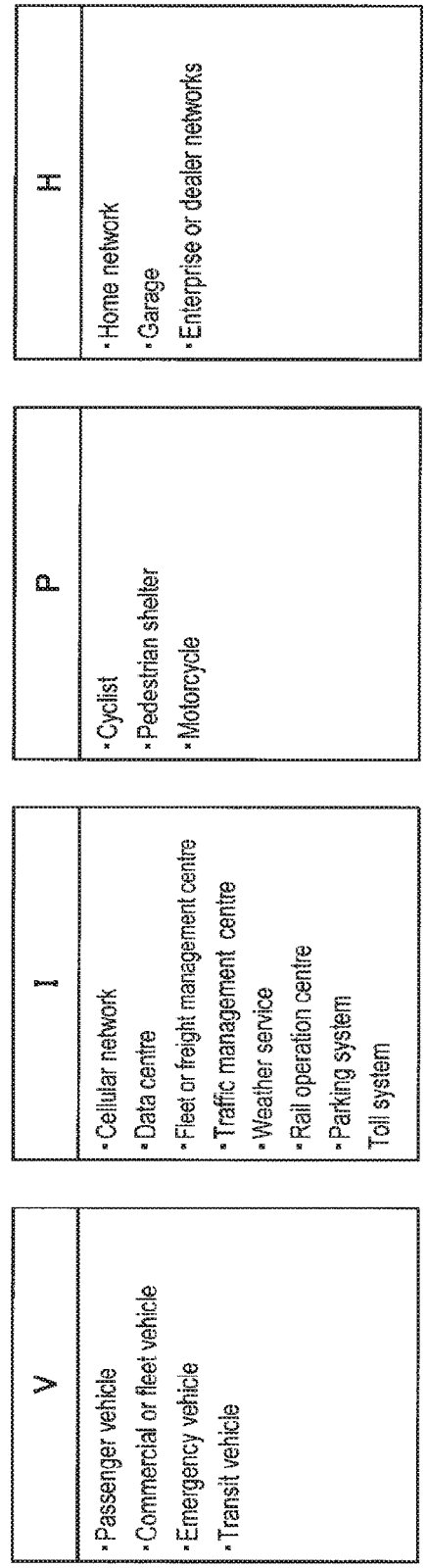

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will proceed in the following order.

0. Introduction
1. Overview of wireless communication system
2. Configuration of information processing apparatus
3. Operation
4. Modification
5. Hardware configuration
6. Conclusion

0. INTRODUCTION

By utilizing a communication apparatus onboard a moving object such as a vehicle, direct communication between the moving object and various target objects is realized. Vehicle communication between a vehicle and various target objects is called vehicle-to-X (V2X) communication. FIG. 1 is an explanatory diagram for describing an overview of V2X communication. As illustrated in FIG. 1, V2X communication may be vehicle-to-vehicle (V2V) communication, vehicle-to-infrastructure (V2I) communication, vehicle-to-pedestrian (V2P) communication, vehicle-to-home (V2H) communication, or vehicle to network (V2N) communication, for example.

As shown in FIG. 1, the communication target of a vehicle in V2V communication may be a passenger vehicle, a commercial or fleet vehicle, an emergency vehicle, or a transit vehicle, for example. Also, the communication target of a vehicle in V2I communication may be a data centre, a fleet or freight management centre, a traffic management centre, a weather service, a rail operation centre, a parking system, or a toll system, for example. Also, the communication target of a vehicle in V2P communication may be a cyclist, a pedestrian shelter, or a motorcycle, for example. Also, the communication target of a vehicle in V2H communication may be a home network, a garage, or enterprise or dealer networks, for example. In addition, a communication target of a vehicle in V2N communication may be a cellular network, for example.

In addition, for V2X communication, communication systems utilizing dedicated short range communications (DSRC) have been investigated thus far, but recently, investigation into communication systems utilizing mobile phone communication standards such as Long Term Evolution (LTE) is progressing.

Examples of applications of V2X communication include communication systems intended for forward collision warning, loss of control warning, emergency vehicle warning, emergency stop, adaptive cruise assist, traffic condition warning, traffic safety, automatic parking, route deviation warning, message transmission, collision warning, communication range extension, traffic volume optimization, curve speed alert, pedestrian collision warning, vulnerable person safety, and the like.

By the way, in traffic, specific moving bodies are recognized as the execution subjects of a specific operation. For example, ambulances, police vehicles, fire engines, and the like, after going through a predetermined procedure such as notification, are recognized by a predetermined organization as emergency vehicles, which are the execution subjects of emergency travel. Vehicles recognized as emergency vehicles are primarily vehicles made available for public safety. For example, police vehicles for the Imperial family, military vehicles, vehicles for road administration, vehicles for rescue operations by local governments, and vehicles for water supply businesses are also recognized as emergency vehicles. In the private sector, wreckers of power companies, gas companies, or railway companies, vehicles of telecommunications carriers, pharmaceutical companies, or broadcast associations, nontransporting EMS vehicles, or vehicles transporting blood for transfusion may also be recognized as emergency vehicles.

In road traffic, ambulances and the like recognized as emergency vehicles can perform emergency travel, such as travel in a state of sticking out past the road, or travel that omits stopping at locations where one must stop according to legal regulations. General vehicles must yield the way so as not to impede the progress of ambulances and the like recognized as emergency vehicles. General vehicles around an ambulance or the like recognized as an emergency vehicle can recognize the presence of the ambulance or the like by a siren sound or the like emitted from the ambulance or the like. In this way, to enable emergency travel by an ambulance or the like recognized as an emergency vehicle, it is necessary to cause surrounding general vehicles to recognize the presence of the ambulance or the like.

Herein, to cause surrounding moving bodies to recognize the presence of a specific moving body recognized as the execution subject of a specific operation, the use of V2X communication is conceivable. For example, to report the presence of an ambulance recognized as an emergency vehicle to surrounding general vehicles, it is conceivable to use a wireless communication system to report a message indicating that the ambulance is approaching to general vehicles around the ambulance. Even in the case in which such a wireless communication system is used, similarly as in the past, the recognition of a moving body as the execution subject of a specific operation is expected to require a predetermined procedure such as notification.

However, performing the recognition of a moving body as the execution subject of a specific operation rapidly in response to the occurrence of an event is considered to be more desirable. For example, when a traffic accident occurs, by recognizing a general vehicle driven by a physician and traveling around the accident site as an emergency vehicle, a message indicating that the vehicle recognized as an emergency vehicle is approaching can be reported to general vehicles around the vehicle driven by the physician. With this arrangement, emergency travel by the vehicle driven by the physician becomes possible, and thus the arrival time of the physician to the accident site can be shortened in some cases compared to the case of waiting for the arrival of an emergency vehicle to the accident site.

Accordingly, this specification proposes a mechanism that can perform the recognition of a moving body as the execution subject of a specific operation rapidly in response to the occurrence of an event.

1. OVERVIEW OF WIRELESS COMMUNICATION SYSTEM

Next, a wireless communication system 1 according to the present embodiment will be described with reference to FIG. 2. As the moving bodies in the wireless communication system that includes an information processing apparatus according to the present disclosure, any of various types of moving bodies may be applied, but in the following description, an example in which vehicles are applied as the moving bodies will be described. Note that in the following description, each of vehicles 30a, 30b, and 30c will also be designated simply the vehicles 30 when not being particularly distinguished.

Figure 2:
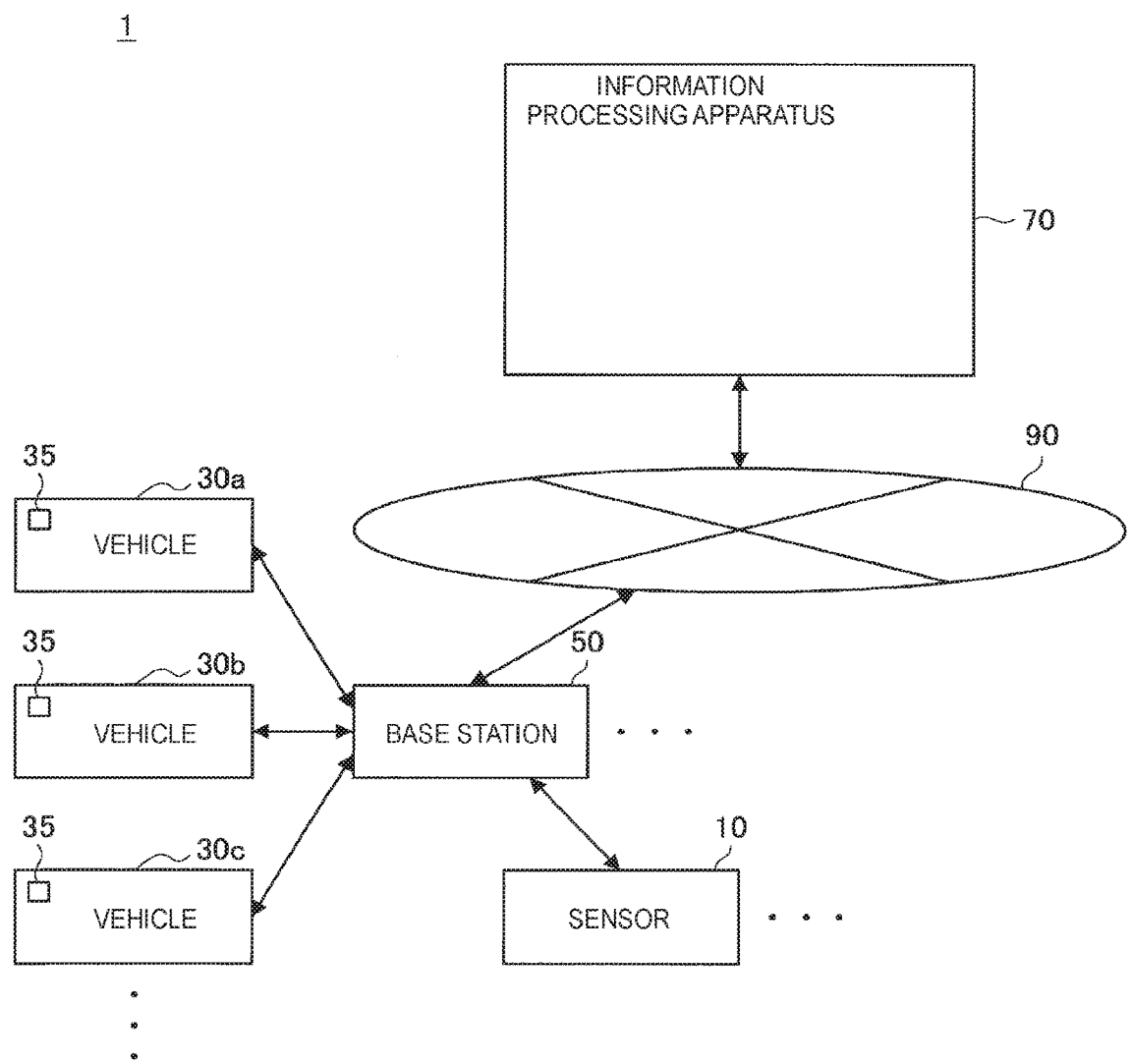
FIG. 2 is an explanatory diagram illustrating a specific example of a wireless communication system according to an embodiment of the present disclosure.

FIG. 2 is an explanatory diagram illustrating a specific example of the wireless communication system 1 according to the present embodiment. As illustrated in FIG. 2, the wireless communication system 1 includes a sensor 10, the vehicles 30, a base station 50, and an information processing apparatus 70. The base station 50 and the information processing apparatus 70 communicate with each other via a wired or wireless network 90. Also, the sensor 10 and the base station 50 communicate with each other in a wired or wireless manner. The vehicles 30 and the base station 50 communicate with each other in a wireless manner.

Note that although a single base station 50 is illustrated with respect to a single information processing apparatus 70 in FIG. 2, multiple base stations 50 may also communicate with a single information processing apparatus 70. Also, although a single sensor 10 is illustrated with respect to a single base station 50 in FIG. 2, multiple sensors 10 may also communicate with a single base station 50. Also, although three vehicles 30 are illustrated with respect to a single base station 50 in FIG. 2, the number of vehicles 30 that communicate with a single base station 50 may also be another number.

The sensor 10 detects various physical quantities, and transmits a detection result. As the sensor 10, any of various types of sensors may be applied. The detection result transmitted from the sensor 10 is received by the information processing apparatus 70 via the base station 50 to which the sensor 10 belongs, and is used in the detection of the occurrence of an event by the information processing apparatus 70. The sensor 10 may be provided on the road, in the vehicles 30, or in the base station 50.

The information transmitted from the sensor 10 as the detection result includes, for example, weather-related information, sound-related information, traffic state-related information, and the like. Examples of the weather-related information include information indicating the amount of rainfall, the temperature, the humidity, or the atmospheric pressure. The amount of rainfall, the temperature, the humidity, or the atmospheric pressure may be detected by applying a rainfall sensor, a temperature sensor, a humidity sensor, or a pressure sensor as the sensor 10. Also, examples of the sound-related information include information indicating an explosion sound, a brake sound, speech, or a horn sound. These sounds may be detected by applying a sound sensor as the sensor 10. Examples of traffic state-related information include information related to congestion conditions or a traffic accident. This information may be generated by having image processing be performed by applying an image sensor as the sensor 10, and having the image sensor perform image processing on image data obtained by the image sensor. In addition, in the case in which the sensor 10 is provided in the vehicles 30, information related to a brake operation of the vehicles 30, information indicating the inter-vehicular distance between a vehicle 30 and another vehicle 30 in front of or behind the vehicle 30, and the like may be transmitted from the sensor 10 as the detection result.

The vehicles 30a, 30b, and 30c are an example of moving bodies according to the present disclosure. The vehicles 30 are driven by drivers, and travel on the ground. Loaded onto the vehicles 30 is a communication apparatus 35 that communicates in a wireless manner with apparatus external to the vehicles 30. The mutually different communication apparatus 35 loaded onto each of the vehicles 30a, 30b, and 30c belong to the base station 50, and communicate with the base station 50. Information transmitted from the communication apparatus 35 to the base station 50 may be transmitted to the information processing apparatus 70 via the base station 50. The communication apparatus 35 may also communicate with another communication apparatus 35 different from the communication apparatus 35. For example, the communication apparatus 35 loaded onto the vehicle 30a may communicate with the communication apparatus 35 loaded onto each of the vehicles 30b and 30c. Note that the vehicles 30b and 30c are an example of vehicles 30 that travel around the vehicle 30a.

The communication apparatus 35 may also communicate with each apparatus provided in the vehicles 30. For example, in the case in which the sensor 10 is provided in the vehicles 30, the communication apparatus 35 acquires the detection result output from the sensor 10, and transmits the detection result to the base station 50. Also, in the case in which an operation input apparatus that receives operation input of the driver is provided in the vehicles 30, the communication apparatus 35 may acquire information input by the driver through the operation input apparatus, and transmit the information to the base station 50. Also, in the case in which a display apparatus or an audio output apparatus is provided in the vehicles 30, the communication apparatus 35 may output information received from the base station 50 to the display apparatus or the audio output apparatus.

Figure 3:
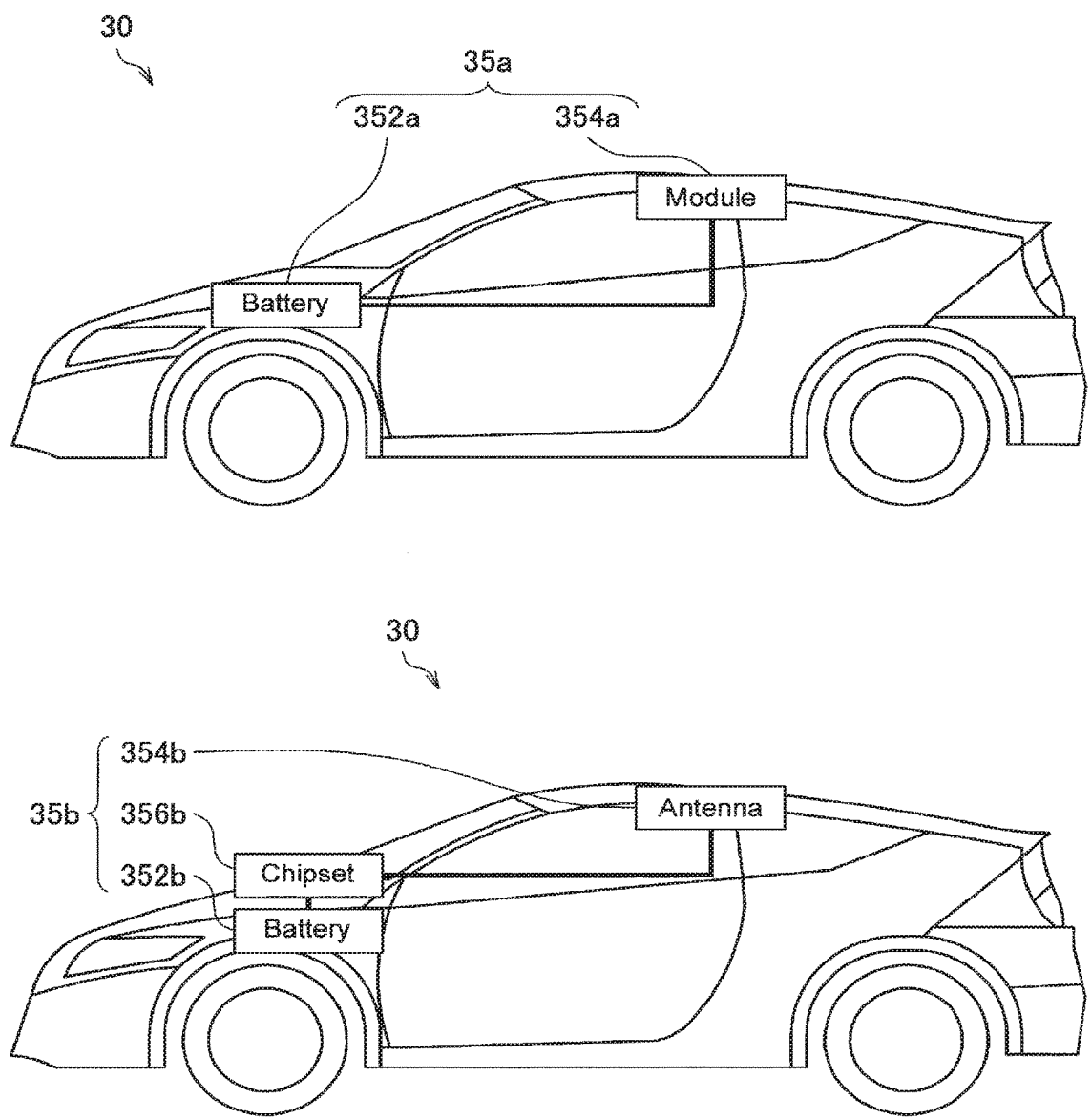
FIG. 3 is an explanatory diagram illustrating a specific example of a schematic configuration of the communication apparatus loaded onto a vehicle according to the embodiment.

FIG. 3 is an explanatory diagram illustrating a specific example of a schematic configuration of the communication apparatus 35 loaded onto the vehicle 30 according to the present embodiment. The upper diagram and the lower diagram of FIG. 3 respectively illustrate specific examples of mutually different configurations of the communication apparatus 35 loaded onto the vehicle 30. The communication apparatus 35a illustrated in the upper diagram of FIG. 3 includes a battery (Battery) 352a and a communication module (Module) 354a. The battery 352a is a power supply source that supplies power to the communication module 354a, and is electrically connected to the communication module 354a. The communication module 354a communicates with an apparatus external to the vehicle 30. The communication apparatus 35b illustrated in the lower diagram of FIG. 3 includes a battery (Battery) 352b, an antenna (Antenna) 354b, and a chipset (Chipset) 356b. The battery 352b is a power supply source that supplies power to the antenna 354b and the chipset 356b, and is electrically connected to the chipset 356b and the antenna 354b. The antenna 354b communicates with an apparatus external to the vehicle 30. The chipset 356b controls the communication with an external apparatus by the antenna 354b. Hereinafter, the description will return to FIG. 2 and continue.

The base station 50 controls wireless communication with apparatus belonging to the base station 50. For example, the base station 50 communicates with the communication apparatus 35 loaded onto the vehicles 30. Also, the base station 50 communicates with the information processing apparatus 70 via the network 90. For example, the base station 50 transmits information received from the sensor 10 or the communication apparatus 35 to the information processing apparatus 70. Additionally, the base station 50 may also perform resource allocation for communication by the apparatus belonging to the base station 50. Note that the base station 50 may be a roadside unit.

The information processing apparatus 70 recognizes a vehicle 30 as the execution subject of a specific operation, and reports the presence of the vehicle 30 recognized as the execution subject to vehicles 30 around the vehicle 30.

The information processing apparatus 70 recognizes in advance a specific vehicle 30 as the execution subject of a specific operation, and communicates to report the presence of the specific vehicle 30 to vehicles 30 around the specific vehicle 30. Specifically, the information processing apparatus 70 recognizes in advance ambulances, police vehicles, fire engines, and the like as emergency vehicles, which are the execution subjects of emergency travel. Also, the information processing apparatus 70 communicates to report the presence of an ambulance or the like recognized as an emergency vehicle to other vehicles 30 around the ambulance or the like.

In addition, the information processing apparatus 70 detects the occurrence of an event, and recognizes a vehicle 30 as the execution subject of an operation appropriate to the event that has occurred. The information processing apparatus 70, on the basis of information related to a vehicle 30 transmitted from the communication apparatus 35 loaded onto the vehicle 30, and information indicating the event that has occurred, determines whether or not to recognize the vehicle 30 as the execution subject of an operation appropriate to the event. In the case of determining to recognize the vehicle 30 as the execution subject of an operation appropriate to the event, the information processing apparatus 70 recognizes the vehicle 30 as the execution subject of an operation appropriate to the event. Subsequently, the information processing apparatus 70 communicates to report the presence of the vehicle 30 recognized as the execution subject of an operation appropriate to the event to other vehicles 30 around the vehicle 30. Specifically, the information processing apparatus 70 communicates to transmit a signal indicating that the vehicle 30 is an official execution subject of an operation appropriate to the event to other vehicles 30 around the vehicle 30. Hereinafter, as an example, a process by the information processing apparatus 70 in the case in which a traffic accident has occurred will be described.

The information processing apparatus 70 detects the occurrence of a traffic accident, and on the basis of information related a vehicle 30 transmitted from the communication apparatus 35 and information indicating the traffic accident, determines whether or not to recognize the vehicle 30 as the execution subject of an operation appropriate to the traffic accident. For example, it is determined, by the information processing apparatus 70, whether or not to recognize the vehicle 30 as an emergency vehicle, which is the execution subject of emergency travel corresponding to an operation appropriate to the traffic accident. In the case of determining to recognize the vehicle 30 as an emergency vehicle, the information processing apparatus 70 recognizes the vehicle 30 as an emergency vehicle. Subsequently, the information processing apparatus 70 communicates to transmit a signal indicating that the vehicle 30 recognized as an emergency vehicle is an official emergency vehicle to other vehicles 30 around the vehicle 30.

According to the information processing apparatus 70 according to the present embodiment, it is possible to perform the recognition of a moving body as the execution subject of a specific operation rapidly in response to the occurrence of an event. Details about such an information processing apparatus 70 will be described later.

2. CONFIGURATION OF INFORMATION PROCESSING APPARATUS

Figure 4:
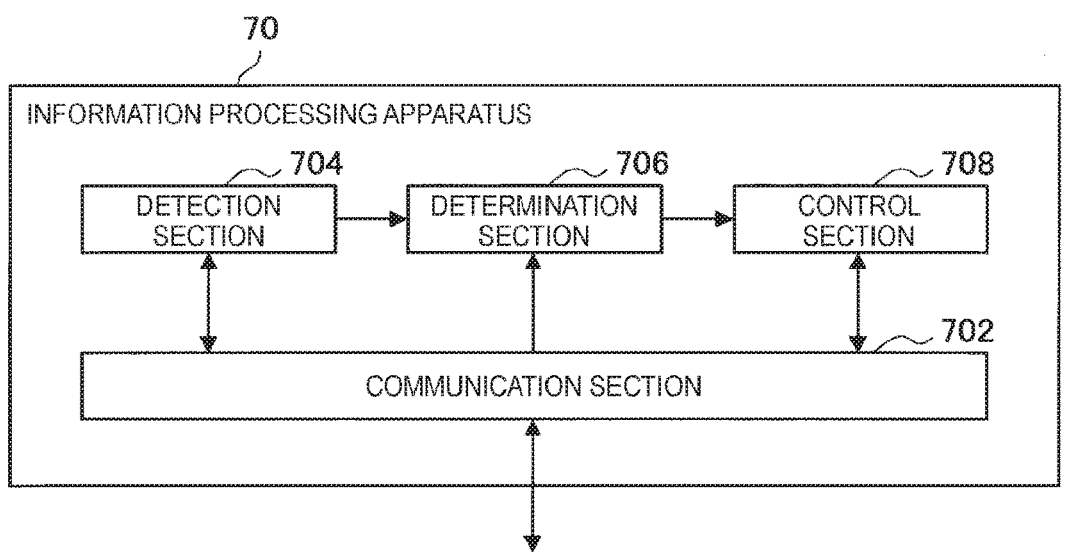
FIG. 4 is an explanatory diagram illustrating an example of a functional configuration of the information processing apparatus according to the embodiment.

Next, a functional configuration of the information processing apparatus 70 according to the present embodiment will be described. FIG. 4 is an explanatory diagram illustrating an example of a functional configuration of the information processing apparatus 70 according to the present embodiment. As illustrated in FIG. 4, the information processing apparatus 70 includes a communication section 702, a detection section 704, a determination section 706, and a control section 708. Note that in the following description, an example in which the target of the determination of whether or not to be recognized as the execution subject of an operation appropriate to an event is the vehicle 30a will be described primarily.

(Communication Section)

The communication section 702 communicates with an apparatus external to the information processing apparatus 70. Specifically, the communication section 702 communicates with the base station 50 via the wired or wireless network 90. The communication section 702 outputs information received from the base station 50 to the detection section 704, the determination section 706, and the control section 708. In addition, the communication section 702 may also communicate with an apparatus external to the information processing apparatus 70 on the basis of operation instructions by each of the detection section 704 and the control section 708. Details about the communication performed by the communication section 702 will be described later in the description of each functional component.

(Detection Section)

The detection section 704 detects the occurrence of an event, and outputs information indicating the event that has occurred to the determination section 706. For example, the detection section 704 detects the occurrence of an event on the basis of information transmitted from the sensor 10. Specifically, the detection section 704 may detect the occurrence of a traffic accident in the case in which the magnitude of an explosion sound, a brake sound, or a horn sound detected by the sensor 10 is greater than a predetermined value. In addition, the detection section 704 may also detect the occurrence of a traffic accident in the case of receiving information indicating that a traffic accident has occurred as the information related a traffic accident from the sensor 10.

The detection section 704 may also detect the occurrence of an event on the basis of information transmitted from the communication apparatus 35 of the vehicles 30. Specifically, in the case in which the sensor 10 is provided in the vehicles 30, if a detection result output from the sensor 10 is transmitted from the communication apparatus 35, the detection section 704 may detect the occurrence of a traffic accident on the basis of the detection result. Also, in the case in which information indicating the occurrence of a traffic accident input by the drivers of the vehicles 30 is transmitted from the communication apparatus 35, the detection section 704 may detect the occurrence of the traffic accident on the basis of the information indicating the occurrence of the traffic accident.

The detection section 704 may also detect the occurrence of an event on the basis of information transmitted from an apparatus other than the sensor 10 and the vehicles 30 via the network 90. For example, in the case in which information indicating the occurrence of a traffic accident is transmitted from a mobile terminal of a pedestrian around the position where a traffic accident has occurred, the detection section 704 may detect the occurrence of the traffic accident on the basis of the information indicating the occurrence of the traffic accident. Also, in the case in which an operation input apparatus that receives operation input of an operator is provided in the information processing apparatus 70, the detection section 704 may detect the occurrence of a traffic accident on the basis of information input by the operator of the information processing apparatus 70.

In the case in which the occurrence of an even is detected, the detection section 704 may also output, to the communication section 702, an operation instruction to transmit information indicating the occurrence of the event. In the case in which the occurrence of an event is detected, the communication section 702, on the basis of an operation instruction by the detection section 704, transmits information indicating the occurrence of the event to the communication apparatus 35 loaded onto the vehicles 30 via the base station 50. The base station 50 broadcasts or multicasts the information indicating the occurrence of an event received from the communication section 702 to the communication apparatus 35 belonging to the base station 50. By having the communication apparatus 35 output the information indicating the occurrence of an event to the display apparatus or audio output apparatus provided in the vehicles 30, the drivers of the vehicle 30 can be made to recognize the occurrence of the event.

The detection section 704 may also set the destination of the transmission of the information indicating the occurrence of an event in accordance with the event. Specifically, in the case in which the information indicating the occurrence of an event is multicast by the base station 50, the detection section 704 may set the destination of the transmission by the base station 50 of the information indicating the occurrence of an event on the basis of the event that has occurred. Subsequently, the communication section 702 transmits information indicating the set destination of the transmission to the base station 50 on the basis of an operation instruction by the detection section 704. For example, in the case in which a traffic accident has occurred, the detection section 704 sets the destination of the transmission by the base station 50 of the information indicating the occurrence of the traffic accident to the communication apparatus 35 loaded onto the vehicles 30 driven by doctors. With this arrangement, information indicating the occurrence of an event is multicast to the communication apparatus 35 loaded onto the vehicles 30 driven by doctors among the communication apparatus 35 belonging to the base station 50. Therefore, it is possible to preferentially cause the drivers of vehicles 30 highly relevant to the event that has occurred to recognize the occurrence of the event.

The detection section 704 may also set the destination of the transmission by the communication section 702 of the information indicating the occurrence of an event in accordance with the position where the event has occurred. Subsequently, on the basis of an operation instruction by the detection section 704, the communication section 702 transmits information indicating the occurrence of the event to the set destination of transmission. For example, in the case in which a traffic accident has occurred, the detection section 704 sets the destination of the transmission by the communication section 702 of information indicating the occurrence of the traffic accident to the base station 50 installed in a location near the position where the traffic accident has occurred. With this arrangement, the information indicating the occurrence of the traffic accident is transmitted to the base station 50 installed in a location near the position where the traffic accident has occurred. Therefore, the information indicating the occurrence of the traffic accident is transmitted to the communication apparatus 35 loaded onto vehicles 30 traveling around the accident site. Therefore, it is possible to preferentially cause the drivers of vehicles 30 traveling in a location near the position where an event has occurred to recognize the occurrence of the event.

In the case in which the operation input apparatus and the display apparatus or audio output apparatus are provided in the vehicle 30a, the communication apparatus 35 receiving information indicating the occurrence of an event outputs the information to the display apparatus or the audio output apparatus of the vehicle 30a. Additionally, information indicating the intention of the driver of the vehicle 30a with respect to the vehicle 30a being recognized as the execution subject of an operation appropriate to the event is input via the operation input apparatus of the vehicle 30a by the driver of the vehicle 30a recognizing the occurrence of the event. The information indicating the intention input by the driver is transmitted to the base station 50 by the communication apparatus 35 of the vehicle 30a, and received by the communication section 702 via the base station 50. The information indicating the intention received by the communication section 702 is used in a determination process by the determination section 706.

Note that in the case in which the information indicating the occurrence of an event is transmitted to the communication apparatus 35 of the vehicle 30a, the information indicating the intention of the driver of the vehicle 30a with respect to the vehicle 30a being recognized as the execution subject of an operation appropriate to the event may also be transmitted by the communication apparatus 35 without being associated with an input operation by the driver. In such a case, the information indicating the intention transmitted by the communication apparatus 35 of the vehicle 30a may be set in advance in accordance with an event that occurs.

The communication apparatus 35 of the vehicle 30a transmits information related to the vehicle 30a stored in advance in the communication apparatus 35 of the vehicle 30a to the base station 50. For example, in the case of receiving information indicating the occurrence of an event, the communication apparatus 35 of the vehicle 30a transmits the information related to the vehicle 30a to the base station 50. The information related to the vehicle 30a that is transmitted to the base station 50 is received by the communication section 702 via the base station 50, and used in the determination process by the determination section 706.

The information related to the vehicle 30a includes, for example, information related to the usage of the vehicle 30a, information related to the size of the vehicle 30a, or information related to the driver of the vehicle 30a. Specifically, the information related to the driver of the vehicle 30a includes information indicating the Individual Number, license, occupation, criminal history, address, phone number, and the like of the driver. Note that the information related to the vehicle 30a may also be stored in a different apparatus from the communication apparatus 35 of the vehicle 30a. In such a case, the communication apparatus 35 transmits the information related to the vehicle 30a to the base station 50 after acquiring, via a wired or wireless network, the information related to the vehicle 30a from an apparatus where the information related to the vehicle 30a is stored.

The transmission of the information related to the vehicle 30a by the communication apparatus 35 to the base station 50 may also be performed when triggered by the transmission, by the communication apparatus 35 to the base station 50, of the information indicating the intention of the driver with respect to the vehicle 30a being recognized as the execution subject of an operation appropriate to an event. Also, the transmission of the information related to the vehicle 30a by the communication apparatus 35 to the base station 50 may also be performed continuously or at predetermined time intervals.

Note that in the case of detecting the occurrence of an event, the detection section 704 may also instruct the communication section 702 to transmit information indicating the occurrence of the event to an organization that manages specific vehicles 30 recognized in advance as the execution subjects of operations appropriate to the event. For example, in the case in which the occurrence of a traffic accident is detected as the event, the communication section 702 may transmit information indicating the occurrence of the traffic accident to a fire department that manages ambulances, on the basis of an operation instruction by the detection section 704.

(Determination Section)

The determination section 706 determines whether or not to recognize the vehicle 30a as the execution subject of an operation appropriate to an event, on the basis of the information related to the vehicle 30a transmitted from the communication apparatus 35 of the vehicle 30a, and the information indicating the event that has occurred, and outputs a determination result to the control section 708. For example, in the case in which the occurrence of a traffic accident is detected as an event by the detection section 704, the determination section 706, if the driver of the vehicle 30a has a medical license, the determination section 706 determines to recognize the vehicle 30a as an emergency vehicle, whereas if the driver of the vehicle 30a does not have a medical license, the determination section 706 determines not to recognize the vehicle 30a as an emergency vehicle.

The determination section 706 may also determine whether or not to recognize the vehicle 30a as the execution subject of an operation appropriate to the event on the basis of the information indicating the intention of the driver of the vehicle 30a with respect to the vehicle 30a being recognized as the execution subject of an operation appropriate to the event. For example, in the case in which the driver of the vehicle 30a desires the vehicle 30a to be recognized as the execution subject of an operation appropriate to the event, the determination section 706 determines to recognize the vehicle 30a as the execution subject of an operation appropriate to the event. Also, in the case in which the driver of the vehicle 30a does not desire the vehicle 30a to be recognized as the execution subject of an operation appropriate to the event, the determination section 706 may determine not to recognize the vehicle 30a as the execution subject of an operation appropriate to the event. With this arrangement, the recognition of the vehicle 30a as the execution subject of an operation appropriate to an event can be performed with consideration for the intention of the driver of the vehicle 30a.

(Control Section)

The control section 708 performs the recognition of a vehicle as the execution subject of a specific operation, and outputs to the communication section 702 a communication operation instruction for reporting the presence of a vehicle recognized as the execution subject of a specific operation to vehicles around the vehicle.

The control section 708 recognizes in advance a specific vehicle 30 as the execution subject of a specific operation, and communicates to report the presence of the specific vehicle 30 to other vehicles 30 around the specific vehicle 30. Specifically, the control section 708 recognizes in advance ambulances, police vehicles, fire engines, and the like as emergency vehicles, which are the execution subjects of emergency travel. Also, the control section 708 instructs the communication section 702 to communicate to report the presence of an ambulance or the like recognized as an emergency vehicle to other vehicles 30 around the ambulance or the like.

Also, the control section 708 according to the present embodiment performs the recognition of the vehicle 30a as the execution subject of an operation appropriate to an event in accordance with the determination result by the determination section 706. Subsequently, the control section 708 instructs the communication section 702 to communicate to cause other vehicles 30 around the vehicle 30a to recognize the presence of the vehicle 30a recognized as the execution subject of an operation appropriate to the event. Specifically, the control section 708 instructs the communication section 702 to transmit information for transmitting a signal indicating that the vehicle 30a recognized as the execution subject of an operation appropriate to the event is an official execution subject to the communication apparatus 35 of other vehicles 30 around the vehicle 30a.

The signal indicating that the vehicle 30a is an official execution subject which is transmitted to the communication apparatus 35 of other vehicles 30 around the vehicle 30a is a message decided by the control section 708, for example. In the case in which the vehicle 30a is recognized as the execution subject of an operation appropriate to an event that has occurred, the control section 708 decides the message to be transmitted to the communication apparatus of the other vehicles 30 around the vehicle 30a.

The communication section 702, on the basis of an operation instruction by the control section 708, for example, transmits to the base station 50 information by which the communication apparatus 35 of the vehicle 30a transmits the signal indicating that the vehicle 30a recognized as the execution subject of an operation appropriate to the event that has occurred is a valid execution subject of an operation appropriate to the event.

Specifically, the communication section 702 transmits information indicating the vehicle 30a and information indicating a message decided by the control section 708 to the base station 50. The base station 50, on the basis of the information indicating the vehicle 30a, transmits the information indicating the message to the communication apparatus 35 of the vehicle 30a. Also, the base station 50 allocates resources for the communication apparatus 35 of the vehicle 30a to transmit the message. Subsequently, the base station 50 reports the resource allocation result to the communication apparatus 35 of the vehicle 30a. With this arrangement, the communication apparatus 35 of the vehicle 30a becomes able to transmit the message to the vehicles 30b and 30c. By having the communication apparatus 35 of the vehicles 30b and 30c receiving the message output the message to the display apparatus or the audio output apparatus of the vehicles 30b and 30c, the drivers of the vehicles 30b and 30c can recognize the message. Therefore, the drivers of the vehicles 30b and 30c can recognize that the vehicle 30a is a valid execution subject of an operation appropriate to the event that has occurred. Thus, the vehicle 30a becomes able to execute the operation appropriate to the event that has occurred, without being impeded by the other vehicles 30 around.

Figure 5:
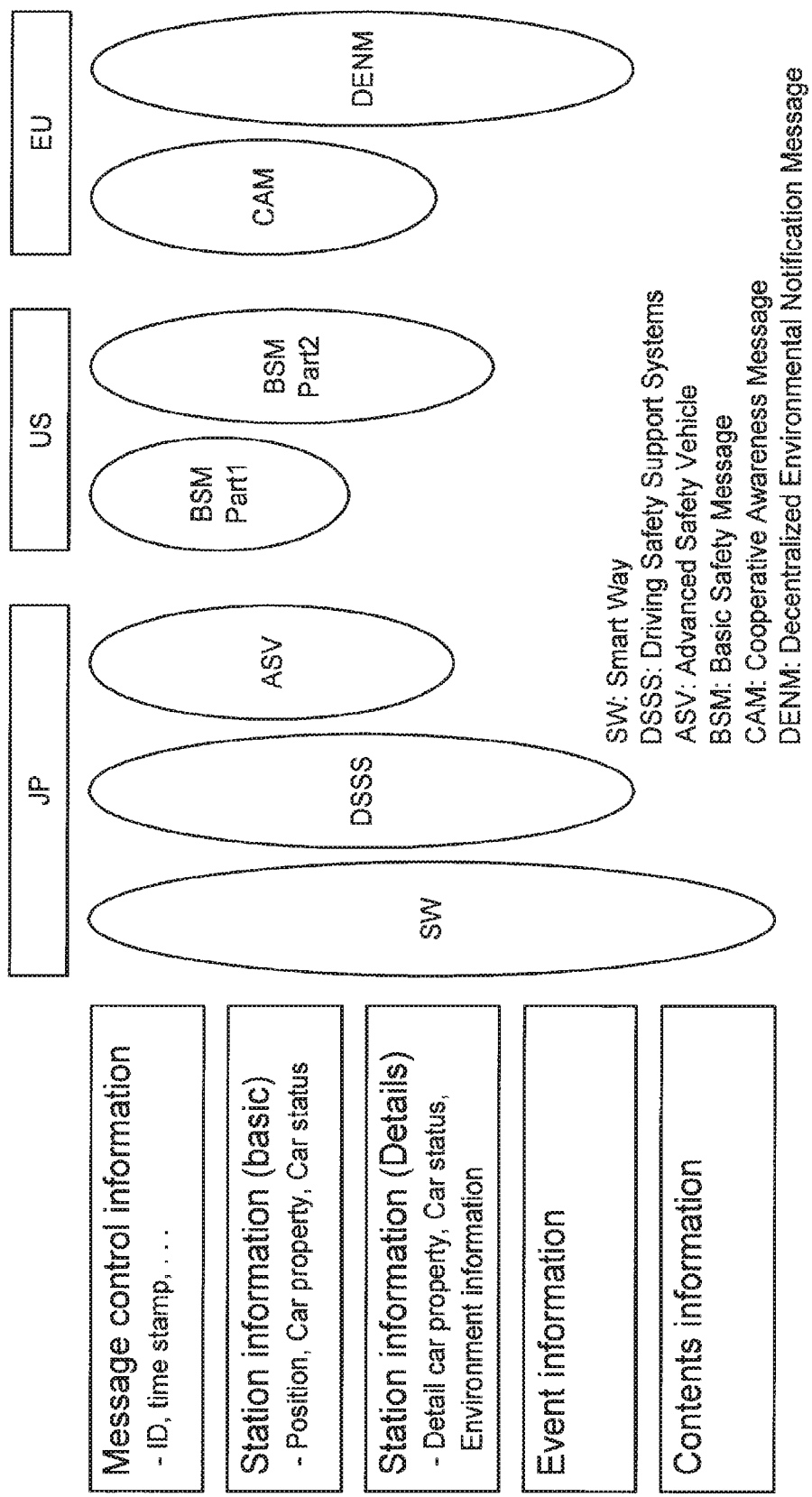
FIG. 5 is an explanatory diagram illustrating an example of message categories and message sets that a vehicle recognized as an emergency vehicle is enabled to transmit.

FIG. 5 is an explanatory diagram illustrating an example of message categories and message sets that the vehicle 30a recognized as an emergency vehicle is enabled to transmit in the case in which a traffic accident occurs as the event, and the vehicle 30a is recognized as an emergency vehicle. As illustrated in FIG. 5, examples of message categories that the vehicle 30a recognized as an emergency vehicle is enabled to transmit include Message control information indicating unique IDs and the like of the vehicles 30, Station information basic indicating the positions and the like of the vehicles 30, Station information Details, Event information related to the content of an event, and Contents information related to contents.

The control section 708 may also decide a message as needed with consideration for conditions, such as the emergency level of the situation, as the message that the vehicle 30a is enabled to transmit. For example, the control section 708 may decide, in accordance with conditions such as the emergency level of the situation, a message corresponding to any one category among the categories illustrated in FIG. 5 as the message that the vehicle 30a is enabled to transmit. Note that a category other than the categories illustrated in FIG. 5 may also be applied as the message category.

In addition, the control section 708 may also decide a message set corresponding to one or more categories as the message that the vehicle 30a is enabled to transmit. For example, as illustrated in FIG. 5, message sets corresponding to one or more categories are set for individual geographical regions. Specifically, in Japan, Advanced Safety Vehicle (ASV), Driving Safety Support Systems (DSSS), and Smart Way (SW) are set as message sets corresponding to one or more categories. ASV is a message set corresponding to Message control information, Station information basic, and Station information Details, while DSSS is a message set corresponding to Message control information, Station information basic, Station information Details, and Event information, and SW is a message set corresponding to Message control information, Station information basic, Station information Details, Event information, and Contents information.

Also, in the United States, Basic Safety Message (BSM) part 1 and Basic Safety Message (BSM) part 2 are set as message sets corresponding to one or more categories. BSM part 1 is a message set corresponding to Message control information and Station information basic, while BSM part 2 is a message set corresponding to Message control information, Station information basic, and Station information Details.

Also, in Europe, Cooperative Awareness Message (CAM) and Decentralized Environmental Notification Message (DENM) are set as message sets corresponding to one or more categories. CAM is a message set corresponding to Message control information, Station information basic, Station information Details, and Event information, while DENM is a message set corresponding to Message control information, Station information basic, Station information Details, and Event information.

The control section 708 may also decide a message set as needed with consideration for conditions, such as the emergency level of the situation, as the message that the vehicle 30a is enabled to transmit. Note that a set other than the sets illustrated in FIG. 5 may also be applied as the message set.

The communication section 702, on the basis of an operation instruction by the control section 708, may also transmit to the base station 50 information by which the base station 50 transmits the signal indicating that the vehicle 30a recognized as the execution subject of an operation appropriate to the event that has occurred is a valid execution subject of an operation appropriate to the event to one or more communication apparatus 35 different from the communication apparatus 35 of the vehicle 30a.

Specifically, the communication section 702 transmits information indicating the vehicle 30a and information indicating a message decided by the control section 708 to the base station 50. On the basis of the information indicating the vehicle 30a and the information indicating the message, the base station 50 transmits the message to the communication apparatus 35 of the vehicles 30b and 30c. For example, the base station 50 may broadcast the message. By having the communication apparatus 35 of the vehicles 30b and 30c receiving the message output the message to the display apparatus or the audio output apparatus of the vehicles 30b and 30c, the drivers of the communication apparatus 35 of the vehicles 30b and 30c can recognize the message. Therefore, the drivers of the vehicles 30b and 30c can recognize that the vehicle 30a is a valid execution subject of an operation appropriate to the event that has occurred. Thus, the vehicle 30a becomes able to execute the operation appropriate to the event that has occurred, without being impeded by the other vehicles 30 around. Note that the control section 708 may also decide, for example, the messages or message sets described with reference to FIG. 5 as the message that the base station 50 is enabled to transmit.

The communication section 702, on the basis of an operation instruction by the control section 708, may also transmit to the communication apparatus 35 of the vehicles 30 information by which the communication apparatus 35 of the vehicle 30a transmits the signal indicating that the vehicle 30a recognized as the execution subject of an operation appropriate to the event that has occurred is a valid execution subject of an operation appropriate to the event.

Specifically, the communication section 702 transmits information for requesting the base station 50 for information indicating the message decided by the control section 708 and resource allocation to the communication apparatus 35 of the vehicles 30 via the base station 50. The communication apparatus 35 of the vehicles 30 requests the base station 50 for resource allocation for the communication apparatus 35 to transmit the message. After that, the base station 50 allocates resources for the communication apparatus 35 of the vehicles 30 to transmit the message. Subsequently, the base station 50 reports the resource allocation result to the communication apparatus 35 of the vehicles 30. With this arrangement, the communication apparatus 35 of the vehicles 30 become able to transmit the message to the communication apparatus 35 of the vehicles 30b and 30c. By having the communication apparatus 35 of the vehicles 30b and 30c receiving the message output the message to the display apparatus or the audio output apparatus of the vehicles 30b and 30c, the drivers of the vehicles 30b and 30c can recognize the message. Therefore, the drivers of the vehicles 30b and 30c can recognize that the vehicle 30a is a valid execution subject of an operation appropriate to the event that has occurred. Thus, the vehicle 30a becomes able to execute the operation appropriate to the event that has occurred, without being impeded by the other vehicles 30 around.

Note that a vehicle 30 recognized in advance as the execution subject of a specific operation may also be preset to be able to transmit the signal indicating that the vehicle 30 is a valid execution subject of the specific operation. Also, the signal indicating that the vehicle 30 is a valid execution subject of a specific operation may be set to be transmitted by the base station 50 to other vehicles 30 around the vehicle 30. With this arrangement, the presence of a vehicle 30 recognized in advance as the execution subject of a specific operation can be reported to other vehicles 30 around the vehicle 30.

In the case in which an event ends, the communication section 702 may transmit, to the base station 50, information for ending the transmission of the signal indicating that the vehicle 30a recognized as the execution subject of an operation appropriate to the event is a valid execution subject of the operation appropriate to the event. With this arrangement, unfairness to the other vehicles 30 which may occur by the vehicle 30a executing the operation appropriate to the event after the event ends can be avoided.

For example, in the case in which the communication apparatus 35 of the vehicle 30a has been enabled to transmit a message to the communication apparatus 35 of the vehicles 30b and 30c, the communication section 702 requests the base station 50 to end the transmission of the message by the communication apparatus 35 of the vehicle 30a. Subsequently, the base station 50 stops the resource allocation for the communication apparatus 35 of the vehicle 30a to transmit the message, thereby ending the transmission of the message by the communication apparatus 35 of the vehicle 30a.

Also, in the case in which the base station 50 has been enabled to transmit a message to the vehicles 30b and 30c around the vehicle 30a recognized as the execution subject of an operation appropriate to an event, the communication section 702 requests the base station 50 to end the transmission of the message by the base station 50. Subsequently, the base station 50 ends the transmission of the message.

In accordance with information input by the driver of a vehicle 30, the communication section 702 may also transmit, to the base station 50, information for ending the transmission of the signal indicating that the vehicle 30a recognized as the execution subject of an operation appropriate to an event is a valid execution subject of the operation appropriate to the event. With this arrangement, the recognition of the vehicle 30a as the execution subject of an operation appropriate to an event can be revoked with consideration for the intention of the driver of the vehicle 30a.

The communication section 702 may also transmit an ID indicating that the vehicle 30a is recognized as the execution subject of an operation appropriate to an event that has occurred to the communication apparatus 35 of the vehicle 30a recognized as the execution subject via the base station 50. In the case in which the event occurs again, the ID is used to skip the determination process of whether or not to recognize the vehicle 30a as the execution subject of an operation appropriate to the event during the recognition of the vehicle 30a as the execution subject of an operation appropriate to the event. For example, in the case in which the event occurs again, if the ID is transmitted from the communication apparatus 35 of the vehicle 30a to the information processing apparatus 70, the vehicle 30a is recognized as the execution subject of an operation appropriate to the event by the control section 708, without performing the determination process of whether or not to recognize the vehicle 30a as the execution subject of an operation appropriate to the event.

As described above, according to the information processing apparatus 70 according to the present embodiment, the occurrence of an event is detected, and via the base station 50 to which the communication apparatus 35 loaded onto the vehicle 30a belongs, information related to the vehicle 30a is received from the communication apparatus 35. In addition, whether or not to recognize the vehicle 30a as the execution subject of an operation appropriate to the event is determined on the basis of the information related to the vehicle 30a transmitted from the communication apparatus 35 of the vehicle 30a, and the information indicating the event that has occurred. With this arrangement, in the case in which an event occurs, the recognition of the vehicle 30a as the execution subject of an operation appropriate to the event can be performed. Therefore, the recognition of a moving body as the execution subject of a specific operation can be performed rapidly in response to the occurrence of an event.

3. OPERATION

Next, flows of processes performed by the wireless communication system 1 according to the present embodiment will be described. In the first process to the third process described hereinafter, the flows of the processes after the message decision process by the control section 708 (step S222) are different from each other.

(First Process)

Figure 6:
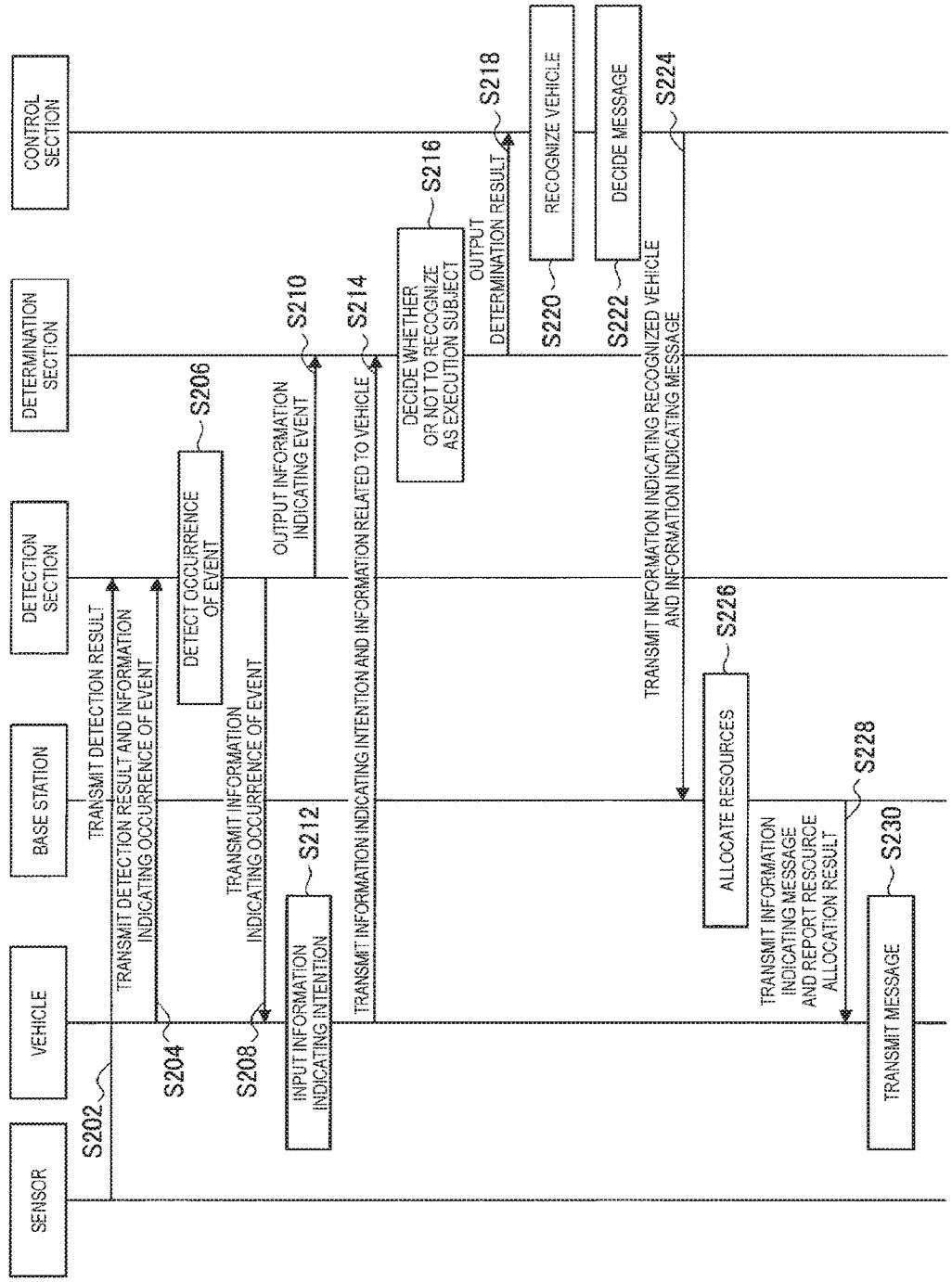
FIG. 6 is a flowchart illustrating an example of the flow of a first process performed by a wireless communication system according to the embodiment.

FIG. 6 is a flowchart illustrating an example of the flow of the first process performed by the wireless communication system 1 according to the present embodiment. As illustrated in FIG. 6, first, a detection result is transmitted from the sensor 10 (step S202). Also, a detection result obtained by the sensor 10 loaded onto the vehicle 30a or information indicating the occurrence of an event input by the driver is transmitted from the communication apparatus 35 of the vehicle 30a (step S204).

Subsequently, the detection section 704 detects the occurrence of the event on the basis of the acquired information (step S206). Information indicating the occurrence of the event is transmitted to the communication apparatus 35 of the vehicles 30 (step S208), and information indicating the event is output to the determination section 706 (step S210). Subsequently, information indicating the intention of the driver of the vehicle 30a with respect to the vehicle 30a being recognized as the execution subject of an operation appropriate to the event is input by the driver of the vehicle 30a (step S212). The communication apparatus 35 of the vehicle 30a transmits the information indicating the invention and information related to the vehicle 30a to the information processing apparatus 70 via the base station 50 (step S214).

The determination section 706 determines whether or not to recognize the vehicle 30a as the execution subject of an operation appropriate to the event on the basis of the information indicating the intention, the information related to the vehicle 30a, and the information indicating the event that has occurred (step S216), and outputs the determination result to the control section 708 (step S218). Subsequently, the control section 708, following the determination result by the determination section 706, recognizes the vehicle 30a as the execution subject of an operation appropriate to the event (step S220). Next, the control section 708 decides the message to be transmitted to the communication apparatus 35 of the vehicles 30b and 30c around the vehicle 30a (step S222).

Subsequently, information indicating the vehicle 30a and information indicating the message decided by the control section 708 is transmitted to the base station 50 (step S224). The base station 50 allocates resources for the communication apparatus 35 of the vehicle 30a to transmit the message (step S226), and reports the resource allocation result to the communication apparatus 35 of the vehicle 30a (step S228). Subsequently, the communication apparatus 35 of the vehicle 30a transmits the message to the communication apparatus 35 of the vehicles 30b and 30c around the vehicle 30a (step S230).

Note that in step S212, in the case in which information indicating the intention of the driver of the vehicle 30a with respect to the vehicle 30a being recognized as the execution subject of an operation appropriate to the event is not input by the driver, in step S214, the information indicating the intention is not transmitted from the communication apparatus 35 of the vehicle 30a. In such a case, in step S216, the determination section 706 determines whether or not to recognize the vehicle 30a as the execution subject of an operation appropriate to the event, on the basis of the information related to the vehicle 30a and the information indicating the event that has occurred.

(Second Process)

Figure 7:
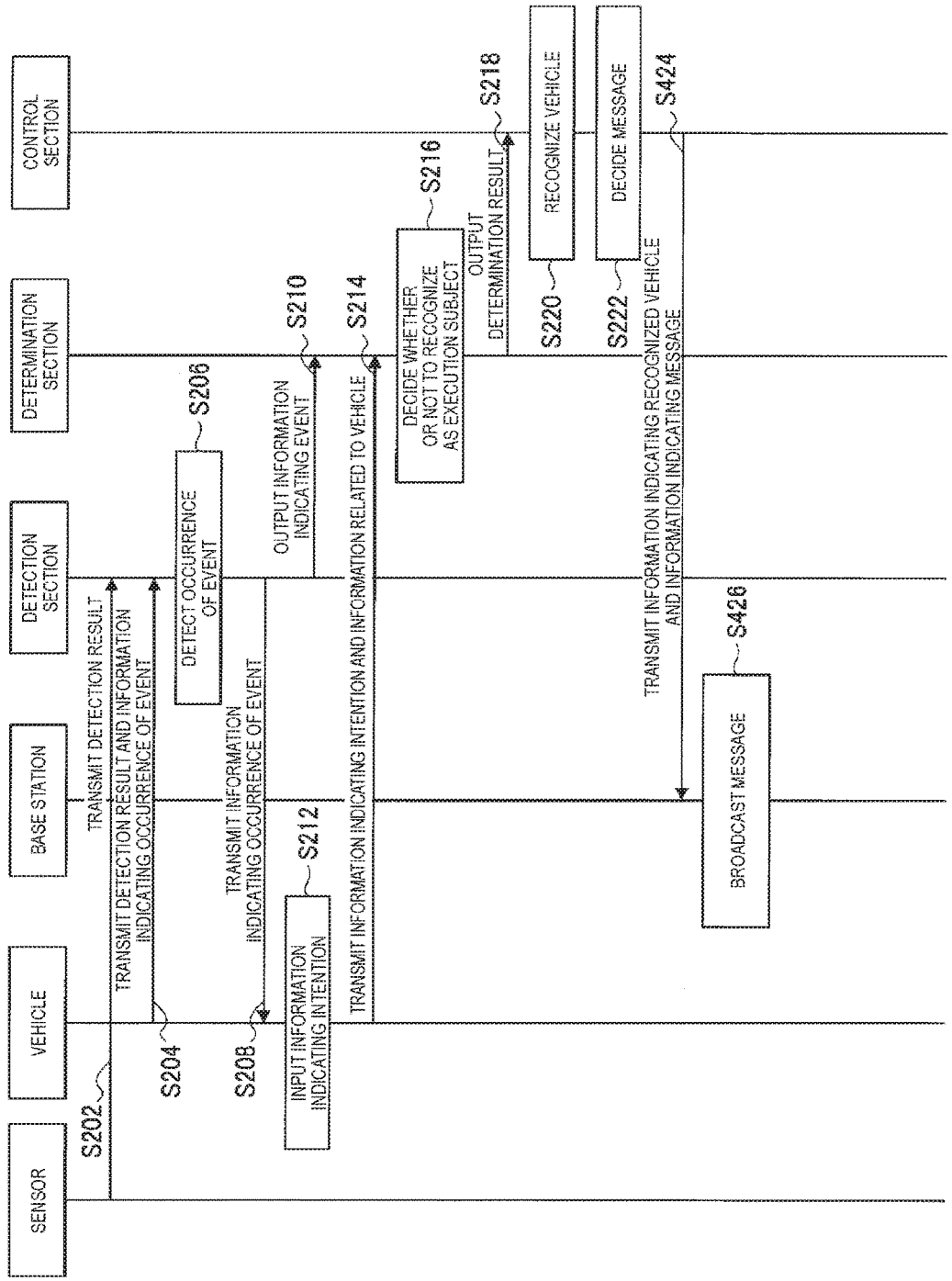
FIG. 7 is a flowchart illustrating an example of the flow of a second process performed by a wireless communication system according to the embodiment.

FIG. 7 is a flowchart illustrating an example of the flow of the second process performed by the wireless communication system 1 according to the present embodiment. In the flow of the second process illustrated in FIG. 7, compared to the flow of the first process described with reference to FIG. 6, the flow of the processes after the message decision process by the control section 708 (step S222) is different. Therefore, the flow of the processes from step S222 will be described.

After the message decision process by the control section 708 (step S222), the information indicating the vehicle 30a and the information indicating the message decided by the control section 708 is transmitted to the base station 50 (step S424). Subsequently, the base station 50 broadcasts the message (step S426).

(Third Process)

Figure 8:
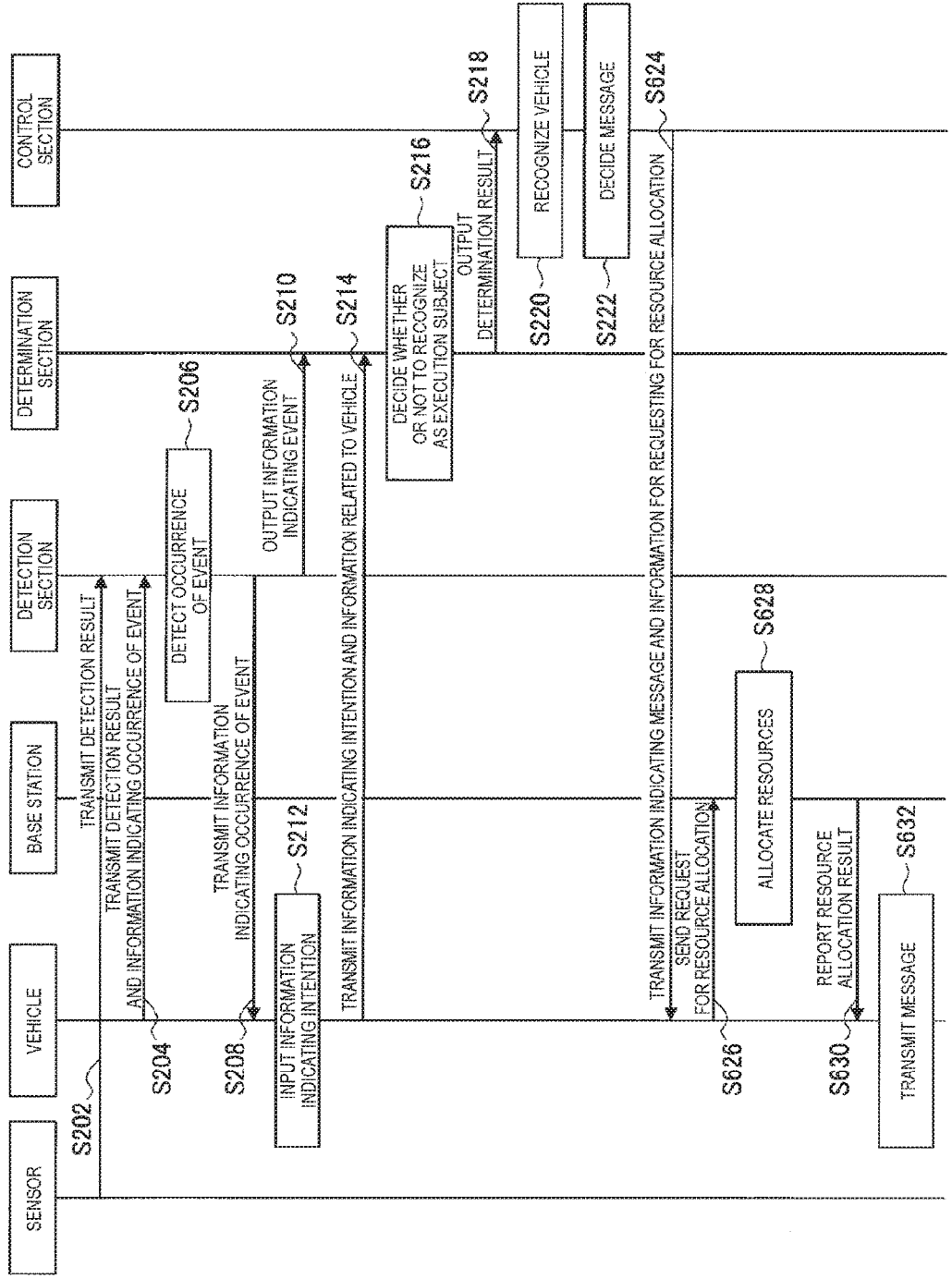
FIG. 8 is a flowchart illustrating an example of the flow of a third process performed by a wireless communication system according to the embodiment.

FIG. 8 is a flowchart illustrating an example of the flow of the third process performed by the wireless communication system 1 according to the present embodiment. In the flow of the third process illustrated in FIG. 8, compared to the flow of the first process described with reference to FIG. 6, the flow of the processes after the message decision process by the control section 708 (step S222) is different. Therefore, the flow of the processes from step S222 will be described.

After the message decision process by the control section 708 (step S222), information indicating the message decided by the control section 708 and information for requesting the base station 50 for resource allocation is transmitted to the communication apparatus 35 of the vehicle 30a via the base station 50 (step S624). Subsequently, the communication apparatus 35 of the vehicle 30a requests the base station 50 for resource allocation for the communication apparatus 35 of the vehicle 30a to transmit the message (step S626). The base station 50 allocates resources for the communication apparatus 35 of the vehicle 30a to transmit the message (step S628), and reports the resource allocation result to the communication apparatus 35 of the vehicle 30a (step S630). Subsequently, the communication apparatus 35 of the vehicle 30a transmits the message to the communication apparatus 35 of the vehicles 30b and 30c around the vehicle 30 (step S632).

4. MODIFICATIONS

In the above, an example in which the vehicles 30 are applied as the moving bodies is described, but moving bodies other than the vehicles 30 may also be applied as the moving bodies in a wireless communication system including the information processing apparatus according to the present disclosure. For example, as the moving bodies, moving bodies that move automatically may be applied, or flying bodies may be applied. Hereinafter, a modification will be described in which flying bodies that move automatically are applied as the moving bodies in a wireless communication system including the information processing apparatus according to the present disclosure.

Figure 9:
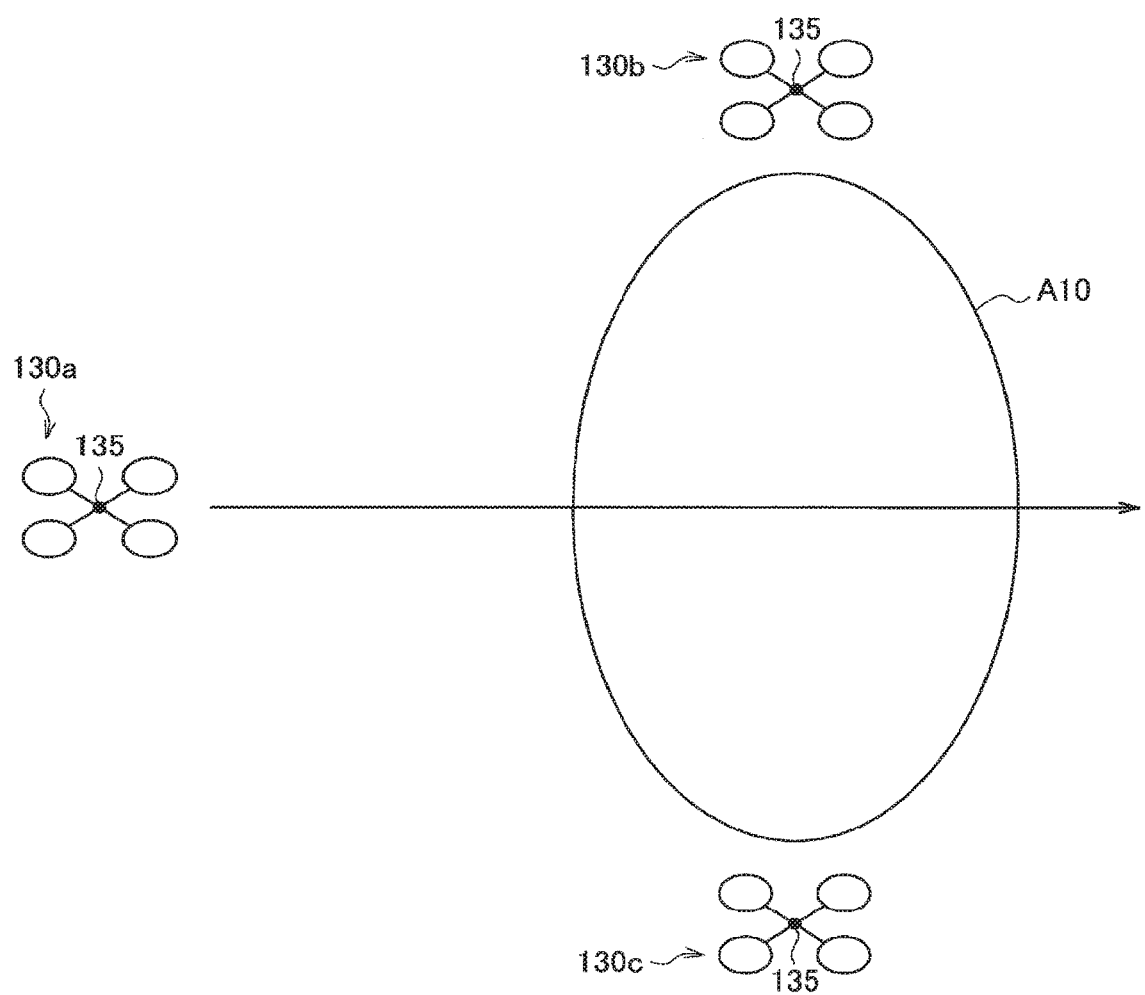
FIG. 9 is an explanatory diagram for describing flight in a no-fly area by flying bodies according to a modification.

FIG. 9 is an explanatory diagram for describing flight in a no-fly area A10 by flying bodies 130 according to the modification. The flying bodies 130a, 130b, and 130c are moving bodies such as drones that fly automatically. Note that in the following description, each of the flying bodies 130a, 130b, and 130c will also be designated simply the flying bodies 130 when not being particularly distinguished.

Loaded onto the flying bodies 130 is a communication apparatus 135 that communicates in a wireless manner with apparatus external to the flying bodies 130. The communication apparatus 135 belongs to a base station, and communicates with the base station. Similarly to the example in which vehicles are applied as the moving bodies described above, in the modification, the information processing apparatus 70 detects the occurrence of an event, and recognizes a flying body 130 as the execution subject of an operation appropriate to the event that has occurred. Subsequently, the information processing apparatus 70 communicates to report the presence of the flying body 130 recognized as the execution subject of an operation appropriate to the event to other flying bodies 130 around the flying body 130.

The no-fly area A10 illustrated in FIG. 9 is an area in which a high security level is set, such as a flight area of an airplane, or the Prime Minister's official residence, for example. In the no-fly area A10, flight is restricted for flying bodies other than flying bodies recognized as flying bodies for security, which are the execution subjects of flight in the no-fly area A10. Herein, the flying bodies 130b and 130c illustrated in FIG. 9 are recognized in advance as flying bodies for security. For example, in the case in which the flying body 130a is not recognized as a flying body for security, if the flying body 130a attempts to intrude into the no-fly area A10, the flying bodies 130b and 130c that fly inside or in the neighborhood of the no-fly area A10 block the intrusion into the no-fly area A10 by the flying body 130a.

In the case in which the occurrence of an incident is detected, the information processing apparatus according to the modification determines whether or not to recognize the flying body 130a as the execution subject of an operation appropriate to the incident, on the basis of information related to the flying body 130a transmitted from the communication apparatus 135, and information indicating the incident. For example, it is determined, by the information processing apparatus, whether or not to recognize the flying body 130a as a flying body for security, which is the execution subject of flight in the no-fly area A10 corresponding to an operation appropriate to the incident. In the case of determining to recognize the flying body 130a as a flying body for security, the information processing apparatus recognizes the flying body 130a as a flying body for security. Subsequently, the information processing apparatus transmits a signal indicating that the flying body 130a recognized as a flying body for security is an official flying body for security to the communication apparatus 135 of each of the other flying bodies 130b and 130c around the flying body 130a.

With this arrangement, the flying bodies 130b and 130c can recognize that the flying body 130a is an official flying body for security, and thus in the case in which the flying body 130a attempts to intrude into the no-fly area A10, the blocking by the flying bodies 130b and 130c of the intrusion into the no-fly area A10 by the flying body 130a can be prevented. With this arrangement, passage through the no-fly area A10 by the flying body 130a becomes possible, and thus the flying body 130a can arrive at the site of the incident without taking a detour around the no-fly area A10. Therefore, by recognizing a flying body 130 flying around the site of an incident as a flying body for security, the arrival time of the flying body to the site of the incident can be shortened in some cases compared to the case of waiting for the arrival of a flying body for security to the site of the incident.

5. HARDWARE CONFIGURATION

The foregoing describes an embodiment of the present disclosure. Processes by the information processing apparatus 70 described above are realized by cooperative action between software, and the hardware of the information processing apparatus 70 described below.

Figure 10:
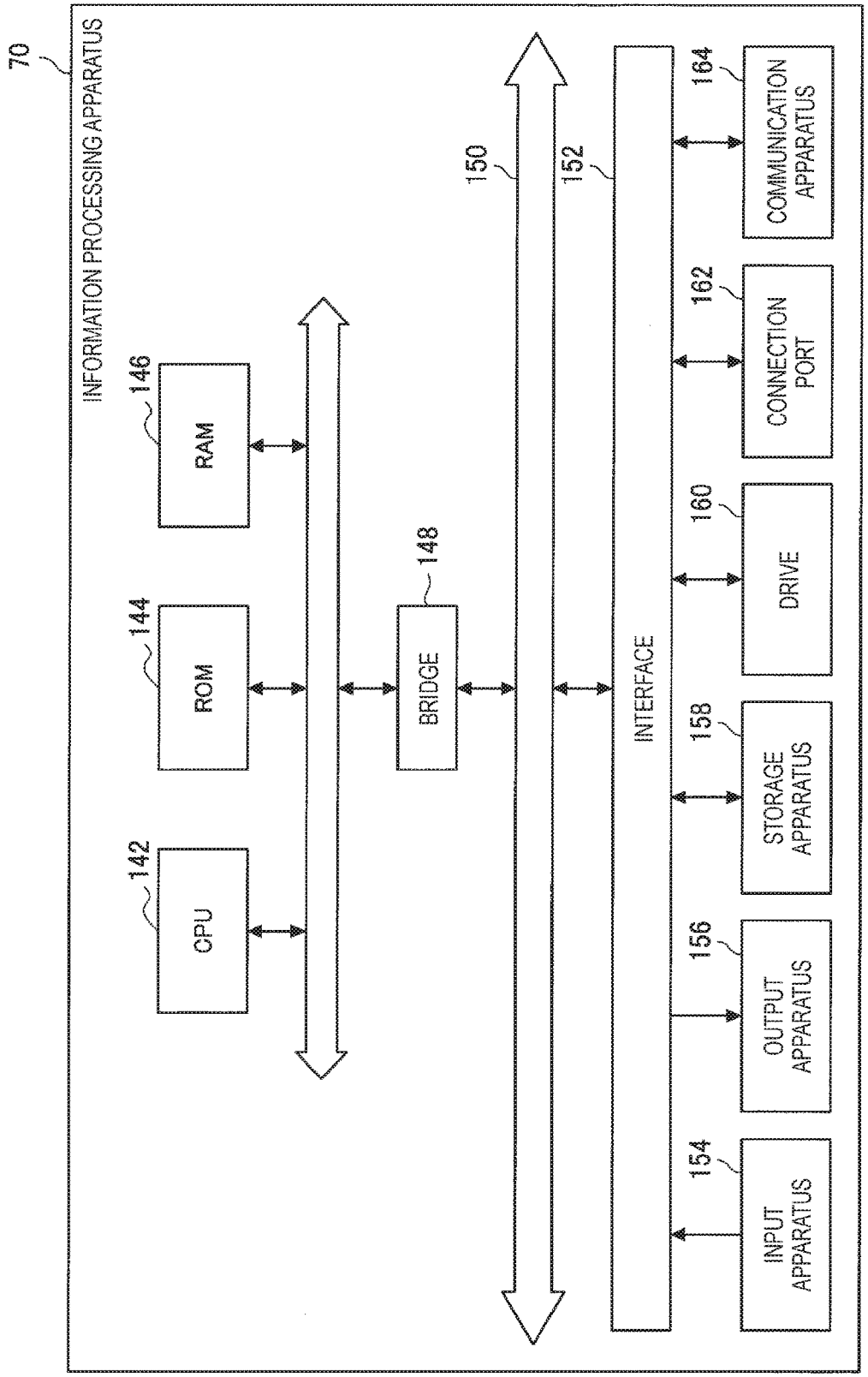
FIG. 10 is an explanatory diagram illustrating an example of a hardware configuration of an information processing apparatus according to the present disclosure.

FIG. 10 is an explanatory diagram illustrating an example of a hardware configuration of the information processing apparatus 70 according to the present disclosure. As illustrated in FIG. 10, the information processing apparatus 70 is provided with a central processing unit (CPU) 142, read-only memory (ROM) 144, random access memory (RAM) 146, a bridge 148, a bus 150, an interface 152, an input apparatus 154, an output apparatus 156, a storage apparatus 158, a drive 160, a connection port 162, and a communication apparatus 164.

The CPU 142 functions as a computational processing apparatus and control apparatus, and cooperates with various programs to realize the operation of each functional component inside the information processing apparatus 70. Also, the CPU 142 may be a microprocessor. The ROM 144 stores programs or computational parameters and the like used by the CPU 142. The RAM 146 temporarily stores programs used during execution by the CPU 142, parameters that change as appropriate during execution, and the like. The CPU 142, the ROM 144, and the RAM 146 are interconnected by an internal bus including a CPU bus or the like.

The input apparatus 154 includes, for example, an input means by which an operator inputs information, such as a mouse, a keyboard, a touch panel, a button, a microphone, a switch, and a lever, input control circuit that generates an input signal on the basis of input from the operator, and outputs to the CPU 142, and the like. By operating the input apparatus 154, the operator of the information processing apparatus 70 is able to input various data and issue processing operation instructions to the information processing apparatus 70.

The output apparatus 156 outputs to an apparatus such as a liquid crystal display (LCD) apparatus, an organic light-emitting diode (OLED) apparatus, or a lamp, for example. Furthermore, the output apparatus 156 may also output sound from a speaker, headphones, or the like.

The storage apparatus 158 is an apparatus used to store data. The storage apparatus 158 may include a storage medium, a recording apparatus that records data to the storage medium, a readout apparatus that reads out data from the storage medium, a deletion apparatus that deletes data recorded to the storage medium, and the like. The storage apparatus 158 stores programs executed by the CPU 142, and various data.

The drive 160 is a reader/writer for a storage medium, and is internally housed inside, or externally attached to, the information processing apparatus 70. The drive 160 reads out information recorded to a removable storage medium such as an inserted magnetic disk, optical disc, magneto-optical disc, or semiconductor memory, and outputs to the RAM 144. Additionally, the drive 160 can also write information to the removable storage medium.

The connection port 162 is a bus for connecting information processing apparatus or peripheral equipment external to the information processing apparatus 70, for example. Also, the connection port 162 may be Universal Serial Bus (USB).

The communication apparatus 164 is a communication interface including a communication device for connecting to a network, for example. Also, the communication apparatus 164 may be an apparatus supporting infrared communication, a communication apparatus supporting wireless local area network (LAN), a communication apparatus supporting Long Term Evolution (LTE), and a wired communication apparatus that communicates by wire.

6. CONCLUSION

As described above, according to an embodiment of the present disclosure, the occurrence of an event is detected, and via a base station to which a communication apparatus loaded onto a moving body belongs, information related to the moving body is received from the communication apparatus. In addition, whether or not to recognize the moving body as the execution subject of an operation appropriate to the event is determined on the basis of the information related to the moving body transmitted from the communication apparatus of the moving body, and the information indicating the event that has occurred. With this arrangement, in the case in which an event occurs, the recognition of the moving body as the execution subject of an operation appropriate to the event can be performed. Therefore, the recognition of a moving body as the execution subject of a specific operation can be performed rapidly in response to the occurrence of an event.

In the foregoing, an example is described in which a message is transmitted to other moving bodies around a moving body as a signal indicating that the moving body recognized as the execution subject of a specific operation is an official execution subject, but the technical scope according to the present disclosure is not limited to such an example. For example, in the example in which vehicles are applied as the moving bodies, a signal indicating position information regarding a vehicle may be applied as a signal indicating that the vehicle recognized as the execution subject of a specific operation is an official execution subject. The other vehicles around the vehicle receiving the signal can display the position of the vehicle recognized as the execution subject of a specific operation on the basis of the signal by a car navigation system, for example. With this arrangement, the presence of the vehicle recognized as the execution subject of a specific operation can be reported to the other vehicles around.

Note that the series of control processes carried out by each apparatus described in the present specification may be realized by software, hardware, or a combination of software and hardware. Programs included in such software may be stored in advance for example on a storage medium (non-transitory medium) provided inside or outside each apparatus. As one example, during execution, each program is loaded into random access memory (RAM) and executed by a processor such as a CPU.

Further, note that it is not necessary for the processes described in this specification with reference to the flowcharts to be executed in the order shown in the flowcharts. Some processing steps may be executed in parallel. Further, additional processing steps may be adopted, and some processing steps may be omitted.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

a detection section configured to detect an occurrence of an event;

a communication section configured to receive, via a base station to which a communication apparatus loaded onto a moving body belongs, information related to the moving body from the communication apparatus; and a determination section configured to determine whether or not to recognize the moving body as an execution subject of an operation appropriate to the event, on a basis of the information related to the moving body and information indicating the event.

(2)

The information processing apparatus according to (1), in which the moving body is a vehicle.

(3)

The information processing apparatus according to (1) or (2), in which in a case in which it is determined to recognize the moving body as the execution subject of the operation, the communication section transmits, to the base station, information for the communication apparatus to transmit a signal indicating that the moving body recognized as the execution subject is the execution subject that is valid of the operation.

(4)

The information processing apparatus according to (1) or (2), in which one or more communication apparatus different from the communication apparatus belong to the base station, and in a case in which it is determined to recognize the moving body as the execution subject of the operation, the communication section transmits, to the base station, information for the base station to transmit a signal indicating that the moving body recognized as the execution subject is the execution subject that is valid of the operation to the one or more communication apparatus.

(5)

The information processing apparatus according to (1) or (2), in which in a case in which it is determined to recognize the moving body as the execution subject of the operation, the communication section transmits, to the communication apparatus, information for the communication apparatus to transmit a signal indicating that the moving body recognized as the execution subject is the execution subject that is valid of the operation.

(6)

The information processing apparatus according to any one of (3) to (5), in which in a case in which the event ends after it is determined to recognize the moving body as the execution subject of the operation, the communication section transmits, to the base station, information for ending the transmission of the signal indicating that the moving body recognized as the execution subject is the valid execution subject of the operation.

(7)

The information processing apparatus according to any one of (3) to (6), in which after it is determined to recognize the moving body as the execution subject of the operation, in accordance with information input by a driver of the moving body, the communication section transmits, to the base station, information for ending the transmission of the signal indicating that the moving body recognized as the execution subject is the valid execution subject of the operation.

(8)

The information processing apparatus according to any one of (1) to (7), in which in a case in which the occurrence of the event is detected, the communication section transmits information indicating the occurrence of the event.

(9)

The information processing apparatus according to (8), in which a destination of the transmission of the information indicating the occurrence of the event is set in accordance with the event.

(10)

The information processing apparatus according to (8) or (9), in which a destination of the transmission of the information indicating the occurrence of the event is set in accordance with a position where the event occurred.

(11)

The information processing apparatus according to any one of (1) to (10), in which the communication section receives, from the communication apparatus via the base station, information indicating an intention of a driver of the moving body with respect to the moving body being recognized as the execution subject of the operation, and the determination section determines whether or not to recognize the moving body as the execution subject of the operation appropriate to the event on a basis of the information indicating the intention of the driver.

(12)

A communication apparatus which, in a case in which an information processing apparatus including a detection section configured to detect an occurrence of an event, a communication section configured to receive, via a base station to which a communication apparatus loaded onto a moving body belongs, information related to the moving body from the communication apparatus, and a determination section configured to determine whether or not to recognize the moving body as an execution subject of an operation appropriate to the event, on a basis of the information related to the moving body and information indicating the event, transmits information for the communication apparatus to transmit a signal indicating that the moving body recognized as the execution subject by the determination section is the execution subject that is valid of the operation, the communication apparatus transmits the signal indicating that the moving body is the valid execution subject of the operation.

(13)

An information processing method including:

detecting, by an information processing apparatus, an occurrence of an event;

receiving, via a base station to which a communication apparatus loaded onto a moving body belongs, information related to the moving body from the communication apparatus; and determining whether or not to recognize the moving body as an execution subject of an operation appropriate to the event, on a basis of the information related to the moving body and information indicating the event.

(14)

A program causing a computer that controls an information processing apparatus to function as:

a detection section configured to detect an occurrence of an event;

a communication section configured to receive, via a base station to which a communication apparatus loaded onto a moving body belongs, information related to the moving body from the communication apparatus; and a determination section configured to determine whether or not to recognize the moving body as an execution subject of an operation appropriate to the event, on a basis of the information related to the moving body and information indicating the event.

REFERENCE SIGNS LIST 1 wireless communication system
10 sensor
30 vehicle
35, 135 communication apparatus
50 base station
70 information processing apparatus
90 network
130 flying body
142 CPU
144 ROM
146 RAM
148 bridge
150 bus
152 interface
154 input apparatus
156 output apparatus
158 storage apparatus
160 drive
162 connection port
164 communication apparatus
352a, 352b battery
354a communication module
354b antenna
356b chipset
702 communication section
704 detection section
706 determination section
708 control section

The invention claimed is:

1. An information processing apparatus, comprising:
processing circuitry configured to
receive, from a sensor, a detection signal indicating detection of an occurrence of an event;
receive, via a base station to which a communication apparatus loaded onto a moving body belongs, first information related to the moving body from the communication apparatus; and
determine whether or not to recognize the moving body as an execution subject of an operation appropriate to the event, based on the first information and second information indicating the event, the second information being derived from the detection signal.

2. The information processing apparatus according to claim 1, wherein the moving body is a vehicle.

3. The information processing apparatus according to claim 1, wherein in a case in which the processing circuitry determines to recognize the moving body as the execution subject of the operation, the processing circuitry transmits, to the base station, third information for the communication apparatus to transmit a signal indicating that the moving body recognized as the execution subject is the execution subject that is valid of the operation.

4. The information processing apparatus according to claim 1, wherein
one or more other communication apparatus different from the communication apparatus belong to the base station, and
in a case in which the processing circuitry determines to recognize the moving body as the execution subject of the operation, the processing circuitry transmits, to the base station, third information for the base station to transmit a signal indicating that the moving body recognized as the execution subject is the execution subject that is valid of the operation to the one or more other communication apparatus.

5. The information processing apparatus according to claim 1, wherein in a case in which the processing circuitry determines to recognize the moving body as the execution subject of the operation, the processing circuitry transmits, to the communication apparatus, third information for the communication apparatus to transmit a signal indicating that the moving body recognized as the execution subject is the execution subject that is valid of the operation.

6. The information processing apparatus according to claim 3, wherein in case in which the event ends after the processing circuitry determines to recognize the moving body as the execution subject of the operation, the processing circuitry transmits, to the base station, fourth information for ending the transmission of the signal indicating that the moving body recognized as the execution subject is the valid execution subject of the operation.

7. The information processing apparatus according to claim 3, wherein after the processing circuitry determines to recognize the moving body as the execution subject of the operation, in accordance with information input by a driver of the moving body, the processing circuitry transmits, to the base station, fourth information for ending the transmission of the signal indicating that the moving body recognized as the execution subject is the valid execution subject of the operation.

8. The information processing apparatus according to claim 1, wherein in a case in which the occurrence of the event is detected, the processing circuitry transmits occurrence information indicating the occurrence of the event.

9. The information processing apparatus according to claim 8, wherein a destination of the transmission of the occurrence information indicating the occurrence of the event is set in accordance with the event.

10. The information processing apparatus according to claim 8, wherein a destination of the transmission of the occurrence information indicating the occurrence of the event is set in accordance with a position where the event occurred.

11. The information processing apparatus according to claim 1, wherein
the processing circuitry receives, from the communication apparatus via the base station, third information indicating an intention of a driver of the moving body with respect to the moving body being recognized as the execution subject of the operation, and
the processing circuit determines whether or not to recognize the moving body as the execution subject of the operation appropriate to the event based on the third information indicating the intention of the driver.

12. A communication apparatus loaded onto a moving body and the moving body bellowing to a base station, the communication apparatus comprising:
first processing circuitry, wherein
an information processing apparatus includes second processing circuitry configured to
receive, from a sensor, a detection signal indicating detection of an occurrence of an event,
receive, via the base station to which the communication apparatus loaded onto the moving body belongs, first information related to the moving body from the communication apparatus, and
determine whether or not to recognize the moving body as an execution subject of an operation appropriate to the event, based on the first information and second information indicating the event, the second information being derived from the detection signal, and
the first processing circuit is configured to
receive information indicating to transmit a signal that indicates that the moving body recognized as the execution subject is the execution subject that is valid of the operation, and
transmit the signal indicating that the moving body is the valid execution subject of the operation.

13. An information processing method, comprising:
receiving, by an information processing apparatus from a sensor, a detection signal indicating detection of an occurrence of an event;
receiving, via a base station to which a communication apparatus loaded onto a moving body belongs, first information related to the moving body from the communication apparatus; and
determining, by information processing apparatus, whether or not to recognize the moving body as an execution subject of an operation appropriate to the event, based on the first information and second information indicating the event, the second information being derived from the detection signal.

14. A non-transitory computer readable medium storing computer executable instructions which, when executed by a computer, cause the computer to:
receive, from a sensor, a detection signal indicating detection of an occurrence of an event;
receive, via a base station to which a communication apparatus loaded onto a moving body belongs, first information related to the moving body from the communication apparatus; and
determine whether or not to recognize the moving body as an execution subject of an operation appropriate to the event, based on the first information and second information indicating the event, the second information being derived from the detection signal.

* * * * *